March 26, 1929.  R. L. DEZENDORF  1,706,567
TESTING APPARATUS
Filed May 30, 1925
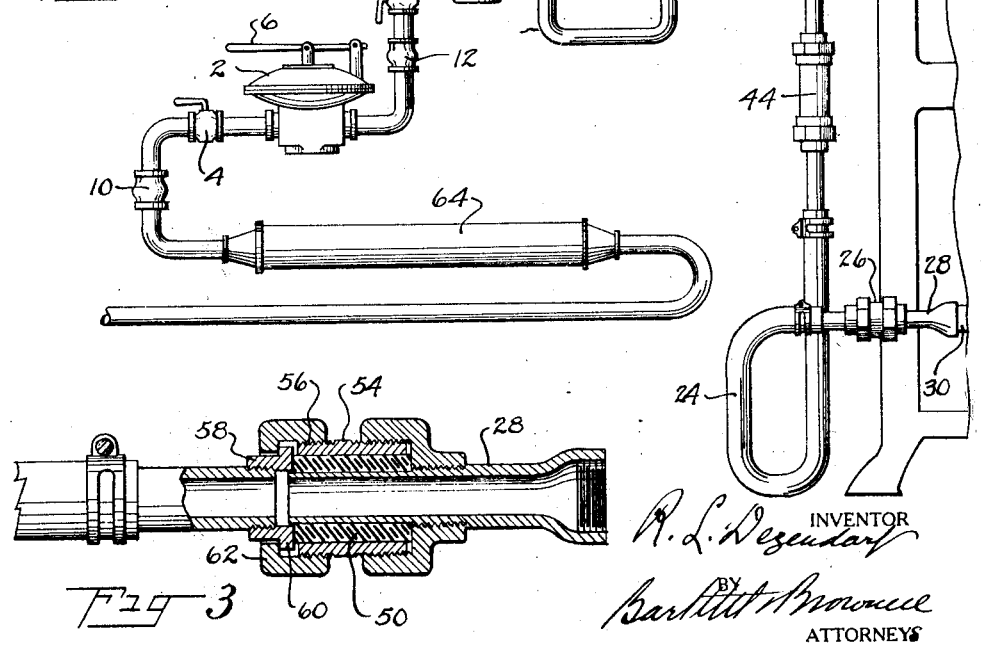

Patented Mar. 26, 1929.

1,706,567

UNITED STATES PATENT OFFICE.

RICHARD LEE DEZENDORF, OF RICHMOND HILL, NEW YORK.

TESTING APPARATUS.

Application filed May 30, 1925. Serial No. 33,862.

My invention relates to apparatus for testing gas ranges or other devices comprising pipes or chambers for holding gas under pressure, and has for its object to provide a novel, simple and efficient means for determining the presence or absence of leaks. It further has for its object to provide means whereby a predetermined pressure can be applied for locating the leaks. It further has for its object to provide other novel and efficient means for securing desirable results as hereinafter more particularly set forth.

The following is a description of an embodiment of my invention, reference being had to the accompanying drawings, in which, Figure 1 is a diagrammatic view of my apparatus;

Fig. 2 is an enlarged detail of one portion thereof;

Fig. 3 is an enlarged detail of a coupling device forming part of my system; and Fig. 4 is a modification of certain parts.

Referring more particularly to the drawings, 2 is a collapsible chamber which, in conjunction with a manually operated valve 4, constitutes a manually operable gas pressure supplying means for the system. The collapsible chamber is manually expanded and compressed by the lever 6, 8 is a manually operable valve in the discharge of the chamber which is closed between successive compressing operations of the chamber 2 and at the end thereof so as to hold the gas confined in the other parts of the system. 10 is a check valve in the pipe leading to the collapsible chamber. This valve, when the gas used in testing is taken from a gas main, guards against back pressure which would result if the cock 4 is left open, which back pressure would produce an undesirable effect at open burners connected to the gas system. 12 is a second check valve in the outlet port of the chamber 2, which may be used if desired. It is preferable not to rely upon the check valves 10 and 12 in the pumping action or in the confining action, since they are not so positive as the manually controlled valves 4 and 8. Connected to the outlet port of the gas supply is a conduit 14 which, by a branch 16, is connected to the glass tube 18 of a water gauge, the same comprising a glass tube and a column of water therein. The lower end of the water gauge is connected to a tank 20 whose upper end is adjacent to the zero point of the gauge, while the upper end of the gauge is connected to a tank 22. The gauge tube 18 is preferably about fifteen inches long and is graduated accordingly, and being of glass the water is visible therethrough. The conduit 14 terminates in a flexible hose 24 which, through a union 26 and coupling member 28, is connected to the manifold of the gas range 30 or other device to be tested.

In operating the apparatus as thus far described, the valves 4 and 8 are opened and the lever 6 raised. The valve 4 is then closed and the lever depressed so as to produce pressure within the tank 20, which causes the water to rise within the glass tube 18 of the gauge. The valve 8 is then closed and the valve 4 opened and the lever 6 raised, the valve 4 is then closed and the valve 8 opened and the lever depressed. The operation is repeated until the water in the gauge tube 18 indicates the desired testing pressure, preferably about fifteen inches of water column. The valve 8 is then closed and the water column observed. If it does not fall, the test indicates that the device tested is tight. If it does fall, it indicates that there is a leak. With this means the presence of a very slight leak can be quickly detected. In order to make the device as sensitive as possible I make all the tubing connections, including the tube 18, as small as compatible with the absence of undue friction and capillary attraction. If these tubular members are of one-half inch internal diameter a sensitive apparatus is produced. The gas employed in testing may be air or may be fuel gas such as would be supplied to the range when in use.

In connection with the parts before described I use a high pressure gauge which is also connected to the outlet of the pressure supply above the valve 8. In Fig. 1 this gauge is indicated as a mercury gauge 32 having an eight inch column of mercury. I also provide a reserve or storage tank 34 which when filled with gas under pressure maintains the pressure in the system relatively high during a considerable period, within which period the location of leaks, if any leakage is found on the low pressure test, can be determined. In using this high pressure gauge I operate the device 2, together with the valves 4 and 8, until a pressure of some five pounds is attained and then confine it by closing the valve 8. In order that this pressure shall not blow the water out of the water gauge I provide a manually operated valve 36 in the low pressure gauge which is closed when the high pressure test is going on and is opened when the low pressure test is going on. In order that the tank 34 shall not interfere with the sensitiveness of the water gauge I provide a manually operated valve 38 which is closed when the low pressure test is going on but is open during the high pressure test. These two valves 36 and 38 can be connected together by the rod 40 connecting their levers so that they may be actuated simultaneously, the one being closed when the other is opened.

In order to prevent the water from the water gauge being blown out if the valve 36 is not closed, I provide the upper tank 22 above referred to which will receive and hold the contents of the tank 20 and the gauge tube 18 with its connections so that the water will flow back after the pressure is reduced. This tank, if large enough, even if not vented, will not interfere practically with the operation of the water gauge. I preferably, however, supply a vent 42 which enables me to use a tank 22 of more limited capacity.

In order to prevent the backward traveling of a flame which might occur if combustible gas were being used in the test, I provide a flame trap 44, shown in detail in Fig. 2, having a gauze barriers 46 therein operating upon the well known Davy lamp principle.

The means for connecting the system to the range consists of a coupling member 28 having a pipe which extends through a rubber gasket 50 confined in a chamber, the wall 54 of which chamber stops below the end of the gasket 50, being screw-threaded at its exposed end 56. 58 is a bushing having a flange 60 which is surrounded by the perforated cap 62 which screws upon the end of the sleeve 54, forcing the flange 60 into close engagement with the rubber gasket 50, thus providing an effective seal against the escape of gas.

In the modification shown in Fig. 4, the valves 36 and 38 controlling the storage tank 34 and the upper end of the water gauge, are shown as plug valves with their axes in alinement and operated by an axial connecting rod 63.

64 is an expansion tank in the intake of the pump which reduces the effect of impulses due to the pumping operation when illuminating gas from a main is used, and permits the gas to assume the normal temperature of the system before reaching the pump.

In testing a gas range the pressure in the pipes, if too high for the low pressure test, can be reduced by opening one of the cocks of the range.

By water gauge I mean a gauge employing any suitable liquid of approximately the specific gravity of water so as to indicate clearly slight variations in pressure. A mercury gauge is not sufficiently sensitive to clearly indicate the mere presence of small leaks.

As will be evident to those skilled in the art, my invention permits of various modifications without departing from the spirit thereof or the scope of the appended claims.

What I claim is:

1. In an apparatus for testing gas ranges, closed pipes, closed chambers, and like devices for holding gas under pressure, the combination of means for supplying gas under pressure, a low pressure gauge clearly indicating slight variations in pressure, a high pressure gauge, a conduit connecting said gauges to the device to be tested and to the outlet of said gas supplying means, a manually controlled valve in said conduit between said gas supplying means and said gauges, and a storage tank connected to the outlet of said pressure supplying means and to said high pressure gauge.

2. In an apparatus for testing gas ranges, closed pipes, closed chambers, and like devices for holding gas under pressure, the combination of means for supplying gas under pressure, a tubular water gauge, a high pressure gauge, a conduit connecting said gauges to the device to be tested and to the outlet of said gas supplying means, a manually controlled valve in said conduit between said gas supplying means and said gauges, a manually operated valve between said high pressure gauge and the upper end of said water gauge, and a storage tank connected to the outlet of said pressure supplying means and to said high pressure gauge.

3. In an apparatus for testing gas ranges, closed pipes, closed chambers, and like devices for holding gas under pressure, the combination of means for supplying gas under pressure, a tubular water gauge, a high pressure gauge, a conduit connecting said gauges to the device to be tested and to the outlet of said supplying means, a manually controlled valve in said conduit between said gas supplying means and said water gauges, a manually operated valve between said high pressure gauge and the upper end of said water gauge, a storage tank connected to the outlet of said pressure supplying means and to the inlet of said high pressure gauge, and means for simultaneously cutting off said tank and opening the manually operated valve of said water gauge.

4. In an apparatus for testing gas ranges, closed pipes, closed chambers, and like devices for holding gas under pressure, the combination of means for supplying gas under pressure, a water gauge clearly indicating slight variations in pressure, a high pressure gauge, a conduit connecting said gauges to the device to be tested and to the outlet of said gas supplying means, a manually controlled valve in said conduit between said gas supplying means and said gauges, a manually operated valve between said high pressure gauge and the upper end of said water gauge, and a tank connected to the upper end of said water gauge.

5. In an apparatus for testing gas ranges, closed pipes, closed chambers, and like devices for holding gas under pressure, the combination of means for supplying gas under pressure, a low pressure gauge clearly indicating slight variations in pressure, a high pressure gauge, a conduit connecting said gauges to the device to be tested and to the outlet of said gas supplying means, a manually controlled valve in said conduit between said gas supplying means and said gauges, and a storage tank connected to the outlet of said pressure supplying means and to said high pressure gauge, and a valve for disconnecting said storage tank from said low pressure gauge.

6. In an apparatus for testing gas ranges, closed pipes, closed chambers, and like devices for holding gas under pressure, the combination of means for supplying gas under pressure, a tubular water gauge, a high pressure gauge, a conduit connecting said gauges to the device to be tested and to the outlet of said gas supplying means, a manually controlled valve in said conduit between said gas supplying means and said gauges, a manually operated valve between said high pressure gauge and the upper end of said water gauge, and a storage tank connected to the outlet of said pressure supplying means and to said high pressure gauge, and a valve for disconnecting said storage tank from said water gauge.

In testimony whereof, I have signed my name to this specification this 29th day of May, 1925.

RICHARD LEE DEZENDORF.